US009197937B1

United States Patent
Rosenberg

(10) Patent No.: US 9,197,937 B1
(45) Date of Patent: Nov. 24, 2015

(54) AUTOMATIC ON-DEMAND NAVIGATION BASED ON META-DATA BROADCAST WITH MEDIA CONTENT

(71) Applicant: Music Choice, Horsham, PA (US)

(72) Inventor: Jeremy C. Rosenberg, Havre de Grace, MD (US)

(73) Assignee: Music Choice, Horsham, PA (US)

( * ) Notice: Subject to any disclaimer, the term of this patent is extended or adjusted under 35 U.S.C. 154(b) by 0 days.

(21) Appl. No.: 14/167,509

(22) Filed: Jan. 29, 2014

Related U.S. Application Data

(63) Continuation of application No. 13/456,813, filed on Apr. 26, 2012, now abandoned.

(51) Int. Cl.
H04N 5/445 (2011.01)
G06F 3/00 (2006.01)
G06F 13/00 (2006.01)
H04N 21/472 (2011.01)

(52) U.S. Cl.
CPC .............................. *H04N 21/47202* (2013.01)

(58) Field of Classification Search
None
See application file for complete search history.

(56) References Cited

U.S. PATENT DOCUMENTS

| 8,245,269 B2* | 8/2012 | Schiller ......................... 725/142 |
| 2003/0192060 A1 | 10/2003 | Levy |
| 2007/0060112 A1* | 3/2007 | Reimer ....................... 455/414.2 |
| 2008/0086742 A1* | 4/2008 | Aldrey et al. .................... 725/24 |
| 2009/0028331 A1* | 1/2009 | Millar et al. ................... 380/255 |
| 2009/0210905 A1* | 8/2009 | Maruyama et al. .............. 725/40 |
| 2009/0327894 A1* | 12/2009 | Rakib et al. ................... 715/719 |
| 2010/0119208 A1* | 5/2010 | Davis et al. ..................... 386/83 |
| 2012/0096499 A1* | 4/2012 | Dasher et al. ................... 725/87 |

* cited by examiner

*Primary Examiner* — Oschta Montoya
(74) *Attorney, Agent, or Firm* — Rothwell, Figg, Ernst & Manbeck, P.C.

(57) ABSTRACT

A method for enabling a user to easily select and consume on-demand content is disclosed. In some embodiments, the method is performed by a communication device and includes the following steps: (1) receiving meta-data received by a set-top-box from a head-end system; (2) in response to receiving the meta-data, obtaining information associated with the received meta-data; (3) displaying one or more on-demand options in response to obtaining the information associated with the meta-data; (4) receiving user input indicating a user of the communication device has selected one of the displayed on-demand options; and (5) in response to receiving the user input, causing the set-top-box to (i) tune to an on-demand channel or (ii) display an on-demand menu.

19 Claims, 7 Drawing Sheets

AUTOMATIC ON-DEMAND NAVIGATION BASED ON META-DATA BROADCAST WITH MEDIA CONTENT

This application is a continuation of pending application Ser. No. 13/456,813, filed on Apr. 26, 2012.

TECHNICAL FIELD

This disclosure relates to the field of automatic on-demand navigation.

BACKGROUND

A user who desires to consume (e.g., listen to, watch) particular on-demand media content (e.g., a song from an album, a particular music video) may use a communication device (e.g., set-top-box) to communicate with an on-demand system (e.g., a video-on-demand system) that has access to the media content and then searches or browses for the desired media content using menus provided by the on-demand system. After locating the desired media content, the user, through the communication device, instructs the on-demand system to transmit (e.g., stream) the desired media content to the user's communication device.

What is desired are systems and methods to make it easier for a user to consume on-demand media content.

SUMMARY

Embodiments of the present invention aim to enable a user to easily consume on demand content. In one aspect, a method is provided. In some embodiments, the method includes: (1) receiving meta-data that was received by a set-top-box from a head-end system; (2) in response to receiving the meta-data, obtaining information associated with the received meta-data; (3) displaying one or more on-demand options in response to obtaining the information associated with the meta-data; (4) receiving user input indicating a user of the communication device has selected one of the displayed on-demand options; and (5) in response to receiving the user input, causing the set-top-box to (i) tune to an on-demand channel or (ii) display an on-demand menu.

In some embodiments, the step of receiving the meta-data comprises receiving an audio watermark embedded in the audio data, wherein the audio watermark includes the meta-data; and decoding the audio watermark to extract the meta-data from the audio watermark. In other embodiments, the step of receiving the meta-data comprises receiving a visual watermark embedded in the video data, wherein the visual watermark includes the meta-data. In still other embodiments, the step of receiving the meta-data comprises receiving a message generated and transmitted by the set-top-box, wherein the message includes the meta-data.

In some embodiments, the step of causing the set-top-box to (i) tune to an on-demand channel or (ii) display an on-demand menu comprises transmitting to the head-end system a message comprising information for identifying the set-top-box, wherein the head-end system is configured such that, in response to receiving the message, the head-end system transmits to the set-top-box a command that causes the set-top-box to (i) tune to the on-demand channel or (ii) display the on-demand menu. The step of transmitting the message to the head-end system may consist of transmitting the message to an HTTP server that is a component of the head-end system. In some embodiments, the message further includes information identifying the on-demand option selected by the user and the head-end system is further configured such that, in response to receiving the message, the head-end system unicasts to the set-top-box a media content item associated with the selected on-demand option.

In another aspect, a communication device for enabling a user to initiate an on-demand session is disclosed. In some embodiments, the communication device includes: (1) a network interface receiving meta-data received by a set-top-box from a head-end system and output from the set-top-box (2) a data processing system. In some embodiments, the data processing system is configured to (i) use the meta-data to obtain information associated with the meta-data and (ii) display one or more on-demand options in response to obtaining the information associated with the meta-data. The data processing system is also operable to receive user input indicating that the user of the communication device has selected one of the displayed on-demand options, and the data processing system is further configured to cause the set-top-box to (i) tune to an on-demand channel or (ii) display an on-demand menu in response to receiving the user input. In some embodiments, the network interface receives the meta-data by receiving an audio signal output from a television speaker, and the meta-data is encoded in the audio signal. In other embodiments, the network interface receives the meta-data by receiving a video signal output from a television display, and the meta-data is encoded in the video signal. In yet other embodiments, the network interface receives the meta-data by receiving a message transmitted from the set-top-box.

In another aspect, a computer program product comprising a non-transitory computer readable medium storing an app operable to be executed by a communication device is disclosed. In some embodiments, the app includes: instructions for extracting meta-data from a signal output from a set-top-box; instructions for using the extracted meta-data to obtain information associated with the meta-data; instructions for displaying to a user of the communication device one or more on-demand options in response to obtaining the information associated with the meta-data; and instructions for causing the set-top-box to (i) tune to an on-demand channel or (ii) display an on-demand menu in response the user selecting one of the one or more on-demand options.

In still another aspect, a method performed by the head-end system is disclosed. In some embodiments, the method includes: (1) broadcasting, over a network, data comprising audio and/or video data (audio/video data) such that the audio/video data may be received simultaneously by a first STB and a second STB when both are tuned to the broadcast channel, the audio/video data corresponding to a particular media content item, wherein a user of the first STB has a communication device operable to: (i) receive meta-data output by the first SIB, the meta-data being associated with the particular media content item, (ii) display to the user one or more on-demand options related to the particular media content item in response to receiving the meta-data, and (iii) transmit to the head-end system a message in response to the user selecting one of the on-demand options; (2) receiving from the communication device the message; and (3) in response to receiving the message, transmitting to the first STB a command that causes the first STB to (i) tune to an on-demand channel or (ii) display an on-demand menu.

The above and other aspects and embodiments are described below with reference to the accompanying drawings.

DETAILED DESCRIPTION

Figure 1:
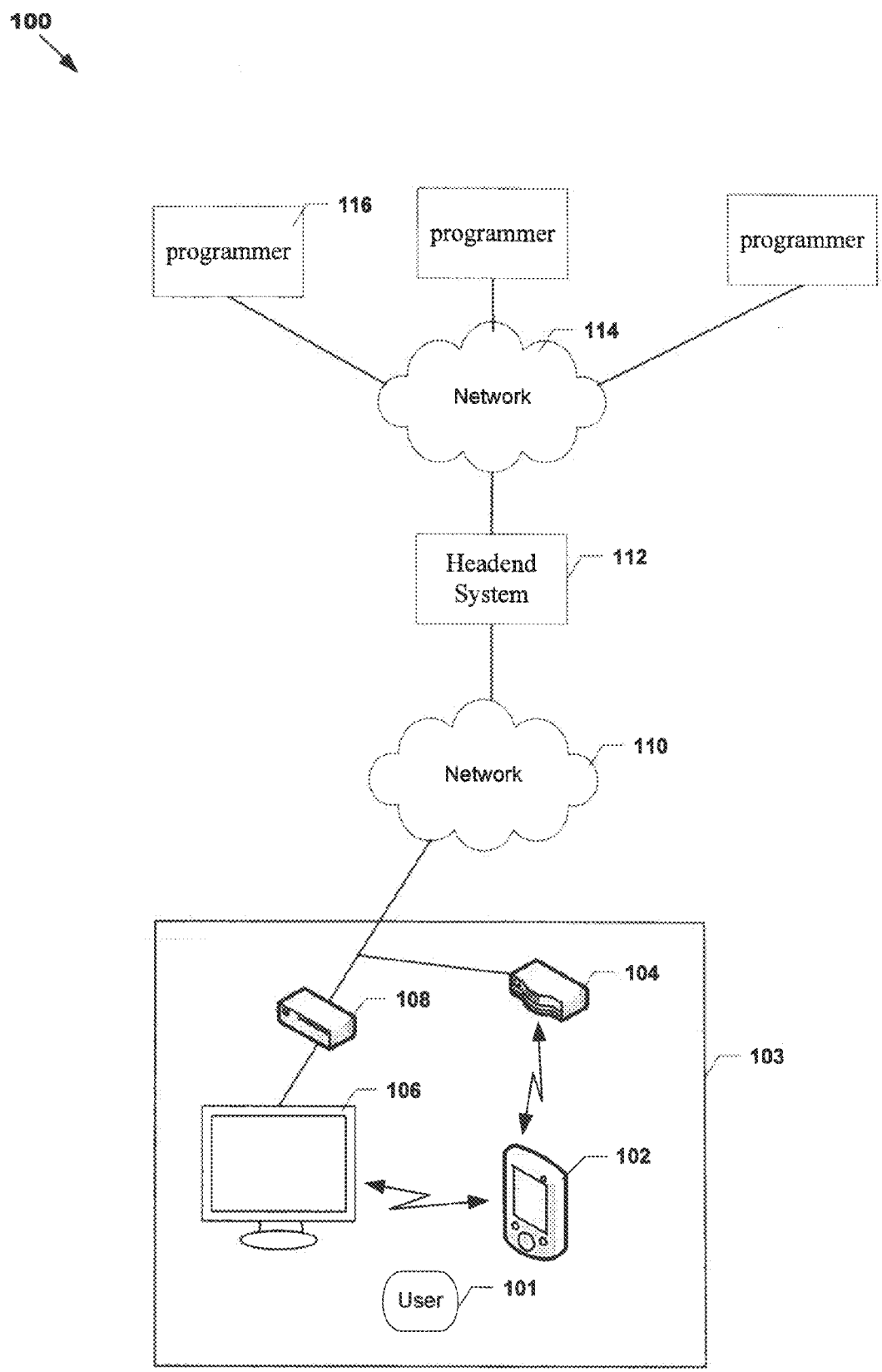
FIG. 1 illustrates an example system according to some embodiments that allows a user to easily consume on-demand media content.

FIG. 1 illustrates an example system 100, according to some embodiments, that allows a user 101 of system 100 to easily consume on-demand media content items (e.g., music videos, movies, TV shows). In the example shown, user 101 may be located within a room of a house 104 and user 101 is using television (TV) 106, which is located in the same room as user 101, to consume media content (e.g., user 101 may be watching a TV program transmitted over a broadcast TV channel). As also shown, user 101 is using a communication device 102, which is also located in the same room as TV 106. Communication device 102 may be a tablet computer (a.k.a., "media tablet"), a smartphone, a computer (e.g., a laptop), or other device capable of outputting information to user 101, receiving input from user 101, and communicating with other devices.

As shown in FIG. 1, house 103 may also include other communication devices, such as a set-top-box (STB) 108 and a wireless router 104. Communication devices 104 and 108 are shown as being connected to a network 110, which may be a network operated by a cable television provider (e.g., Verizon, Comcast, etc.) While STB 108 is shown as being separate and distinct from TV 106, this need not be the case. For example, TV 106 may itself have STB capabilities. Thus, when we refer herein to a "STB" or "set-top-box" we refer not only to conventional STBs, but also to any device that has STB capabilities (e.g., receiving and processing a signal received from network 110), such as a TV that has STB capabilities. Such devices are known in the art as "virtual STBs."

In the embodiment shown, a head-end system 112 may be connected to network 110. Head-end system 112 may receive, via a network 114 (e.g., a satellite network), signals transmitted by programmers 116. Head-end system 112 may process the received signals and broadcast (e.g., multicast) the resulting signals via network 110 so that the signals transmitted by head-end system 112 may be received and processed by a multitude of STBs connected to network 110.

Figure 2:
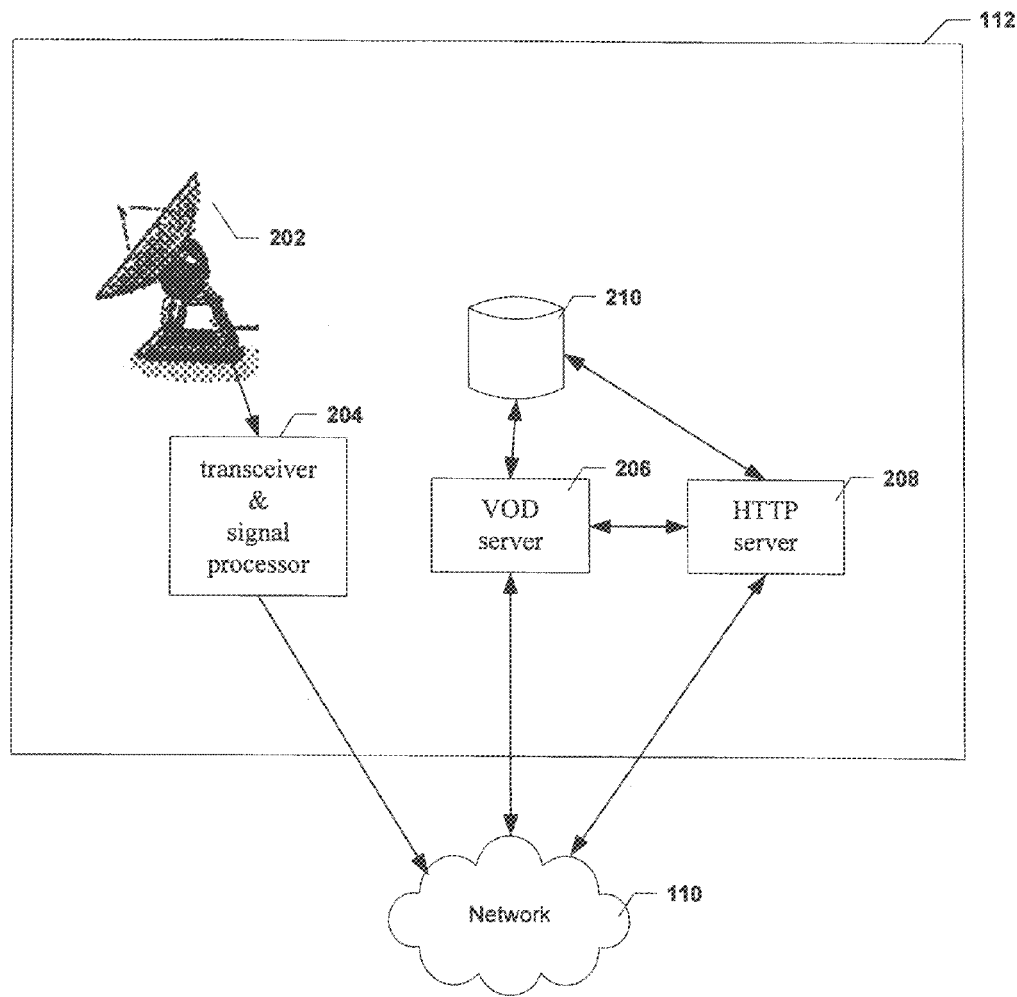
FIG. 2 further illustrates various components of an example head-end system.

FIG. 2 illustrates an example embodiment of head-end system 112. As shown, head-end system 112 may include a satellite dish 202 for receiving a signal containing programming transmitted by programmers 116. Coupled to dish 202 may be a transceiver and signal processor that receives a signal output from dish 202, decodes information included in the signal, recodes the information, and transmits via network 110 a signal containing the recoded information, which signal may be received by STB 108. Head-end system 112 may also include an on-demand server 206 and a hypertext transfer protocol (HTTP) server 208. Servers 206 and 208 may have access to a storage system 210, which may store on-demand media content items (e.g., video files, audio files).

Advantageously, in some embodiments, when user 101 is using TV 106 to consume a media content item, TV 106 may output a signal (an audio signal or video signal) containing meta-data associated with the media content item the user is consuming or the channel the user is watching. The meta-data may contain information identifying or otherwise associated with the media content item or channel. This signal containing the meta-data may be received by communication device 102 and processed by communication device 102 to extract the meta-data, which then may be used by communication device 102 to display one or more on-demand options to user 101. When user 101 selects one of the displayed on-demand options, communication device 102 may cause STB 108 to "tune" to a different channel than the channel to which STB 108 is currently tuned (e.g., it may cause STB 108 to "tune" to a particular on-demand channel over which the selected on-demand media content item is transmitted). In this manner, user 101 can easily consume on-demand media content items.

For example, if a particular app on communication device 102 is running while the signal is output by TV 106, then, in response to receiving the signal, the app may cause communication device 102 to send to a remote server (e.g., server 208 of head-end system 112) a request for information. The request may include an identifier (e.g., a string of characters) the app obtained from the meta-data included in the signal received from TV 106. For example, if the signal received from TV 106 is an audio watermark signal in which embedded therein is meta-data that identifies the media content item the user is currently consuming, the app may process the audio watermark to extract the meta-data. The server, in response to the request, may transmit information to communication device 102 (e.g., a list of available on-demand media content items), which then may display the information to user 101. User 101 may then select one of the listed media content items that is available for on-demand viewing. In response, communication device 102 may cause STB 108 to "tune" to a different channel than the channel to which STB 108 is currently tuned so that STB 108 will receive, process and output the selected media content item.

As used herein, the term "tuning to a channel" does not necessarily mean tuning in a frequency. This is so because TV channels may be, for example, transmitted using different multicast addresses or transmitted on different frequencies. In an IPTV environment, each available channel is typically transmitted using a multicast address specifically associated with the channel. Thus, when STB 108 "tunes" to a channel it may be tuning in the frequency over which the channel is transmitted or it may be joining a multicast group associated with the channel and processing data transmitted using the multicast address associated with the channel. In short, when we refer to a STB "tuning" in a channel, we mean that the STB receives the channel and outputs audio/video data from the channel to a display device so that the user can consume the channel.

Figure 3:
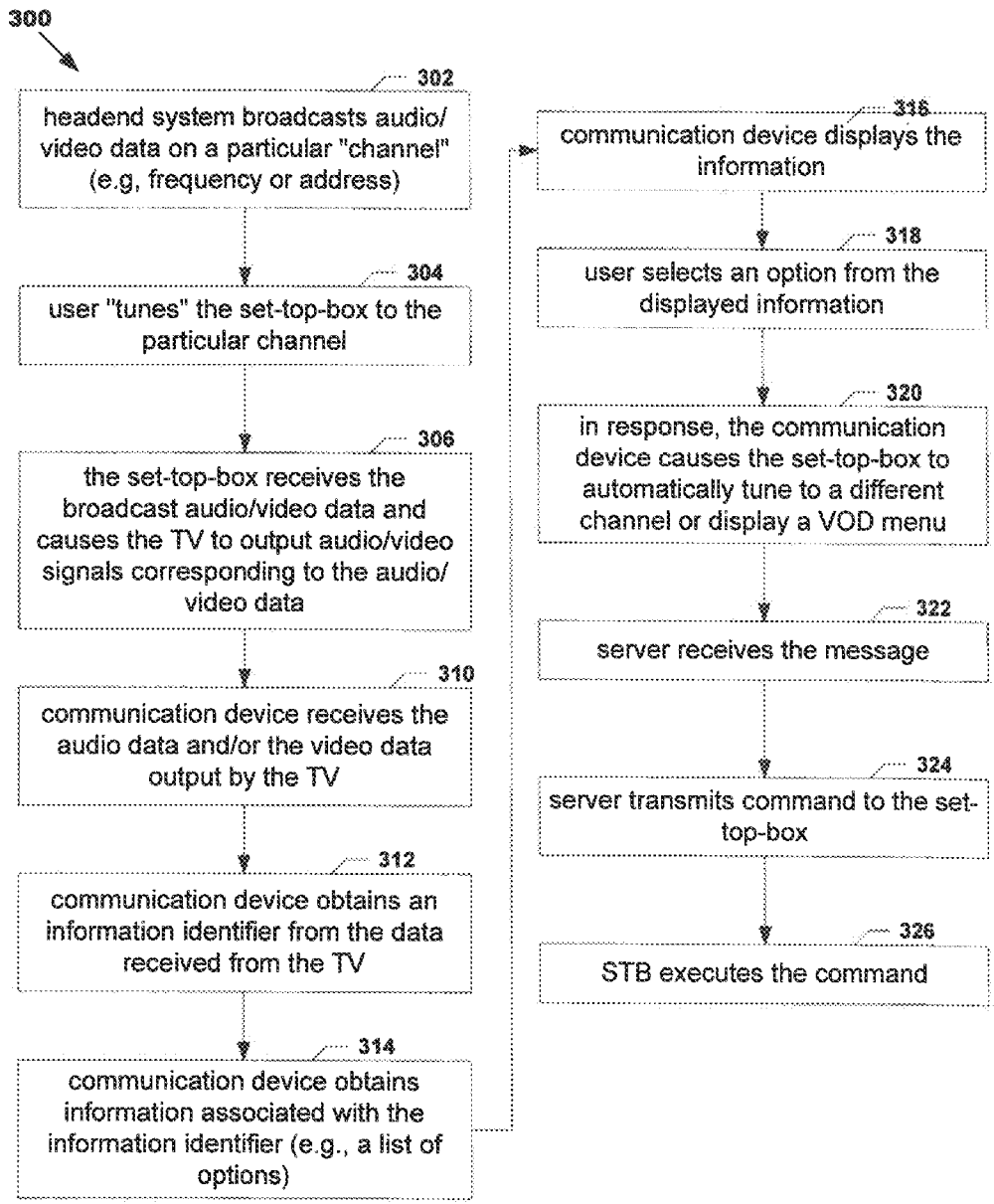
FIG. 3 is a flow chart illustrating a processes according to an embodiment.

FIG. 3 is a flow chart illustrating a process 300, according to some embodiments, for enabling a user 101 of system 100 to easily consume on-demand media content. Process 300 may begin in step 302 where head-end system 112 broadcasts audio/video data (e.g., a TV show) on a particular channel (e.g., a particular broadcast cable channel frequency or a particular multicast address). User 101 "tunes" STB 108 to the particular channel (step 304), which causes STB 108 to use TV 106 to output the audio/video data to user 101 (step 306). In step 310, communication device 102 receives the audio data and/or the video data output by TV 106, and, in step 312, communication device 102 obtains meta-data embedded in the received audio and/or video data.

For example, in step 310, communication device 102 may use a microphone 611 (see FIG. 5) to receive audio data (e.g., an audio watermark) that was output by TV 106, and encoded in the audio data may be the meta-data. Thus, in this embodiment, communicate device 102, in step 312, processes the audio data to extract the meta-data from the audio data. As another example, in step 310, communication device 102 may use a camera 612 (see FIG. 6) to receive video data (e.g., a QR code or other type of barcode) that was output by TV 106, and encoded in the video data may be the meta-data. Thus, in this embodiment, communicate device 102, in step 312, processes the video data to extract the meta-data from the video data.

In step 314, communication device 102 obtains information associated with the meta-data. Communication device 102 may obtain the information from a data storage system 606 (see FIG. 6) of communication device 102 or it may obtain the information from a remote server (e.g., server 208). In the embodiment where communication device 102 obtains the information from the remote server, communication device 102 obtains the information by transmitting to the remote server a request message (e.g., an HTTP GET message) that includes the meta-data with which the information is associated. In response to receiving the request message, the remote server uses the meta-data included in the message to (i) obtain from a data storage system (e.g., data storage system 210) information associated with the meta-data and (ii) transmit the obtained information to communication device 102. For example, the meta-data may be a primary key of a record in a relational table, which record stores the information or a pointer to the information.

In step 316, in response to obtaining the information associated with the meta-data, communication device 102 displays at least some of the information and one or more selectable items (e.g., one or more selectable graphic icons or text-links). Communication device may have a touch screen display 613 for displaying information to user 101. In step 318, user 101 selects one of the selectable items. In response, communication device 102 causes STB 108 to automatically tune to a different channel or display an on-demand menu (step 320).

In some embodiments, communication device 102 may perform step 320 by sending directly to STB 108 a command that causes STB 108 to tune to a different channel or display an on-demand menu. In other embodiments, communication device 102 may perform step 320 by sending a message to a remote server (e.g., server 206 or 208). The message may contain information identifying the address of STB 108 or information that enables the remote server to obtain the address of STB 108 (such as the IP address communication device 102). In such embodiments, the remote server receives the message and, in response, transmits to STB 108 a command that causes STB 108 to tune to a different channel or display an on-demand menu (steps 322, 324). Either way, in step 326, STB 108 responds to the command by tuning to another channel (e.g., an on-demand channel) or displaying an on-demand menu.

In above manner, user 101 can easily find on-demand content and initiate an on-demand session.

In some embodiments in which the communication device 102 sends to a remote server a message that contains information identifying the address of STB 108, the user may first configure the communication device so that it stores the address of STB 108. For example, when the user first runs the app mentioned above, the user may be prompted to input into communication device 102 the address of STB 108 (or an identifier associated with the address of STB 108) or the user may be prompted to cause the communication device to communicate with a remote server to download the address of the STB 108 to communication device 102.

Figure 4:
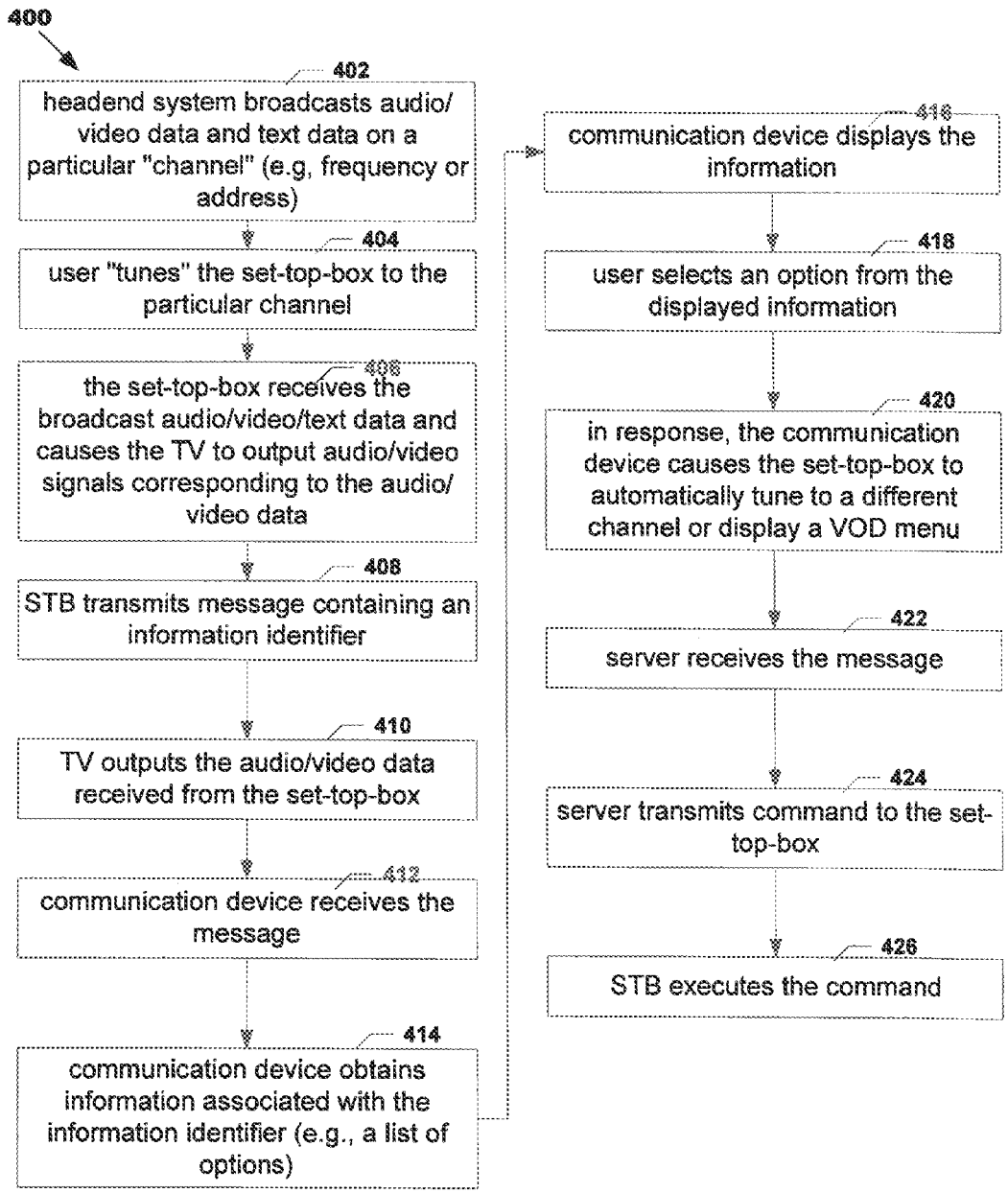
FIG. 4 is a flow chart illustrating a processes according to an embodiment.

FIG. 4 is a flow chart illustrating another process 400, according to some embodiments, for enabling a user 101 of system 100 to easily consume on-demand media content. Process 400 may begin in step 402 where head-end system 112 broadcasts audio/video data (e.g., a TV show) and text data (e.g., meta-data related to the TV show) on a particular channel (e.g., a particular broadcast cable channel frequency or a particular multicast address). User 101 "tunes" STB 108 to the particular channel (step 304), which causes STB 108 to use TV 106 to output the audio/video data to user 101 (step 306) and to process and/or store the text data. After step 304, STB 108 transmits to communication device 102 a message containing meta-data that was included in or derived from the received text data (step 404). In step 406, communication device 102 receives the message transmitted by STB 108, after which communication device performs steps 314-326 (described above).

Example Use Cases

Figure 5:
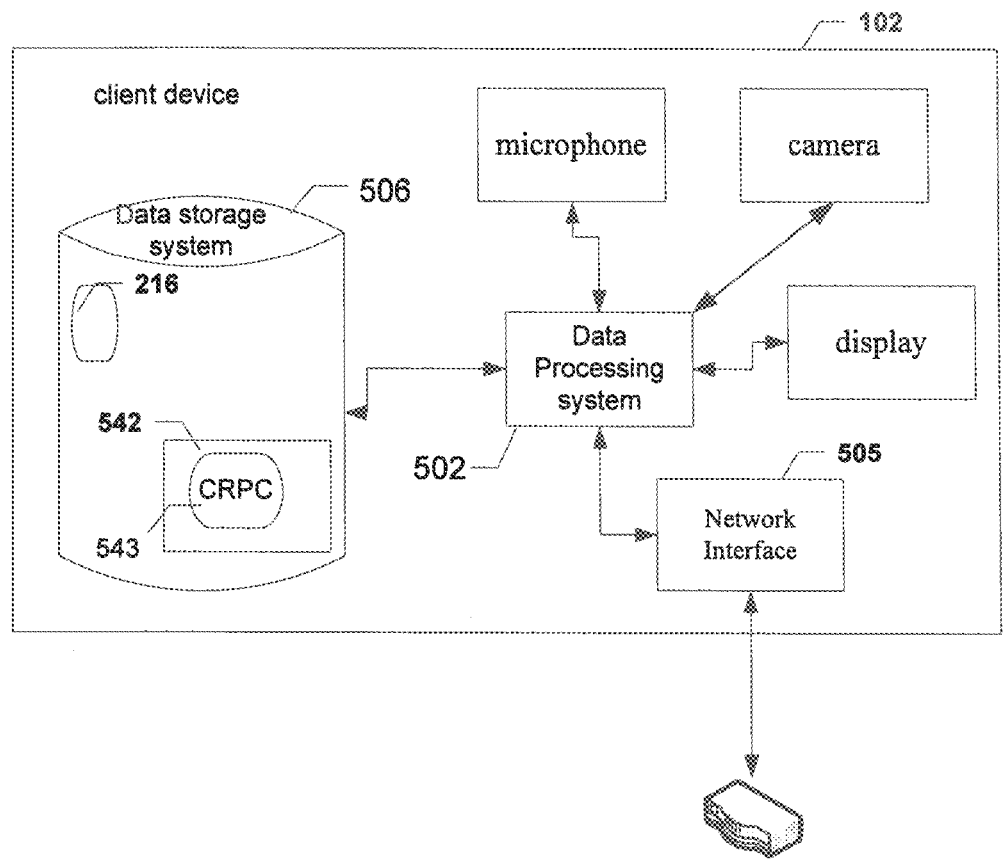
FIG. 5 is a flow chart illustrating an example use case.

FIG. 5 is a flow chart illustrating an example use case 500. Use case 500 may begin with user 101 installing a particular app 643 on communication device 102 (step 502). In step 504, user 101 tunes STB 108 to a particular channel associated with app 643. For example, we shall assume that app 643 is an app provided by or on behalf of Music Choice, and in step 504, user 101 tunes STB 108 to one of the music channels provided by Music Choice. In this example, we shall assume that Music Choice embeds in its music channel an audio watermark that identifies the song that is currently playing on the channel. For example, at any given time, the audio watermark embedded in the audio portion of the channel may contain track, title and artist information for the currently playing song. The audio watermark may also include other information, such as information identifying the music channel and/or the genre of the music channel.

In step 506, user 101 launches app 643. In step 508, app 643 uses communication device 102's microphone 611 (see FIG. 6) to listen for and receive the audio watermark. After receiving the audio watermark, app 643 processes the audio watermark to extract meta-data therefrom (e.g., the artist information and/or channel information contained in the watermark) (step 510).

In step 512, app 643 transmits to server 208 a request message (e.g., an HTTP Get request) containing meta-data obtained from the audio watermark. Server 208 responds by using the meta-data to generate a web document and transmitting to communication device 102 the generated web document (e.g., an HTML document) (step 514). For example, if we assume the meta-data includes the name of an artist, server 208 may use the artist's name to retrieve from a database (e.g., database 210) a list of music videos by the artist and include the list in an HTML template document, thereby creating the web document.

In step 516, communication device 102 displays a web page corresponding to the web document. In this example, the web page contains content associated with the meta-data (e.g., a list of music videos). In step 518, user 101 selects one of the listed music videos. In step 520, in response to the user selection, app 643 transmits to server 208 a message containing an identifier identifying the selected music video. In step 522, in response, server 208 transmits (i) a message to on-demand server 206 that causes on-demand server 206 to begin unicasting to STB 108 the selected music video on a particular on-demand channel (e.g., on-demand server 206 streams the video using a particular the IP address of STB 108) and (ii) a command message to STB 108 that causes STB 108 to tune automatically to the particular on-demand channel. Thus, in this way, user 101 is able to easily consume on-demand content.

In another use case, instead of performing step 522, server 208 may, in response to a message from app 643, send to STB 108 a command message that causes STB 108 to tune automatically to a linear channel identified in the command message. In another embodiment where STB 108 includes or is connected to a digital video recorder (DVR), server 208 may, in response to a message from app 643, send to STB 108 a command message that causes STB 108 to configure the DVR to record a particular channel identified in the command message at a particular date and time identified in the command message for a particular duration identified in the command message (e.g., the command message may instruct STB 108 to record channel 356 for two minutes starting at a certain time on a particular date).

Figure 6:
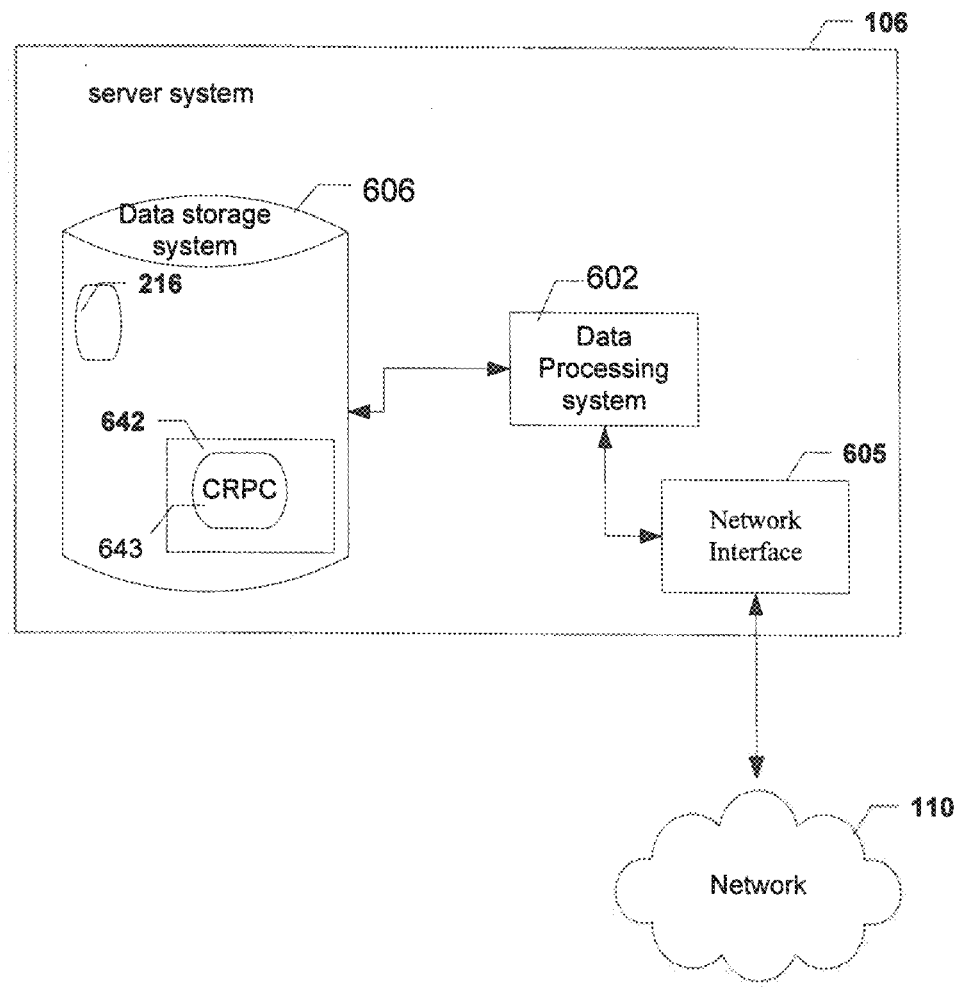
FIG. 6 is a block diagram of a particular embodiment of a communication device.

FIG. 6 illustrates a possible implementation for at least some components of communication device 102 according to some embodiments. As shown in FIG. 6, communication device 102 may include: (i) a data processing system 602, which may include one or more microprocessors and/or one or more circuits, such as an application specific integrated circuit (ASIC), Field-programmable gate arrays (FPGAs), etc; (ii) a network interface 605 for receiving messages (e.g., messages transmitted from device 104 or STB 108); (iii) a data storage system 606, which may include one or more computer-readable mediums, such as non-volatile storage devices and/or volatile storage devices (e.g., random access memory (RAM)); (iv) a microphone 611; (v) a camera 612; (vi) a touch screen display 613; and a (vii) speaker 614. Network interface 605, in some embodiments, includes or consists of a transmitter and a receiver. In embodiments where communication device is a mobile communication device (e.g., a smartphone), the network interface may further include an antenna for transmitting and receiving wireless signals.

In embodiments where data processing system 602 includes a microprocessor, a computer program product is provided, which computer program product includes: computer readable program code 643 (a.k.a., app 643) stored on a computer readable medium 642, such as, but not limited, to magnetic media (e.g., a hard disk), optical media (e.g., a DVD), memory devices (e.g., random access memory), etc. In some embodiments, app 643 is configured such that when executed by a processor, app 643 causes the processor to perform steps described above (e.g., certain steps describe above with reference to the flow charts shown in FIGS. 3, 4 and 5).

Figure 7:
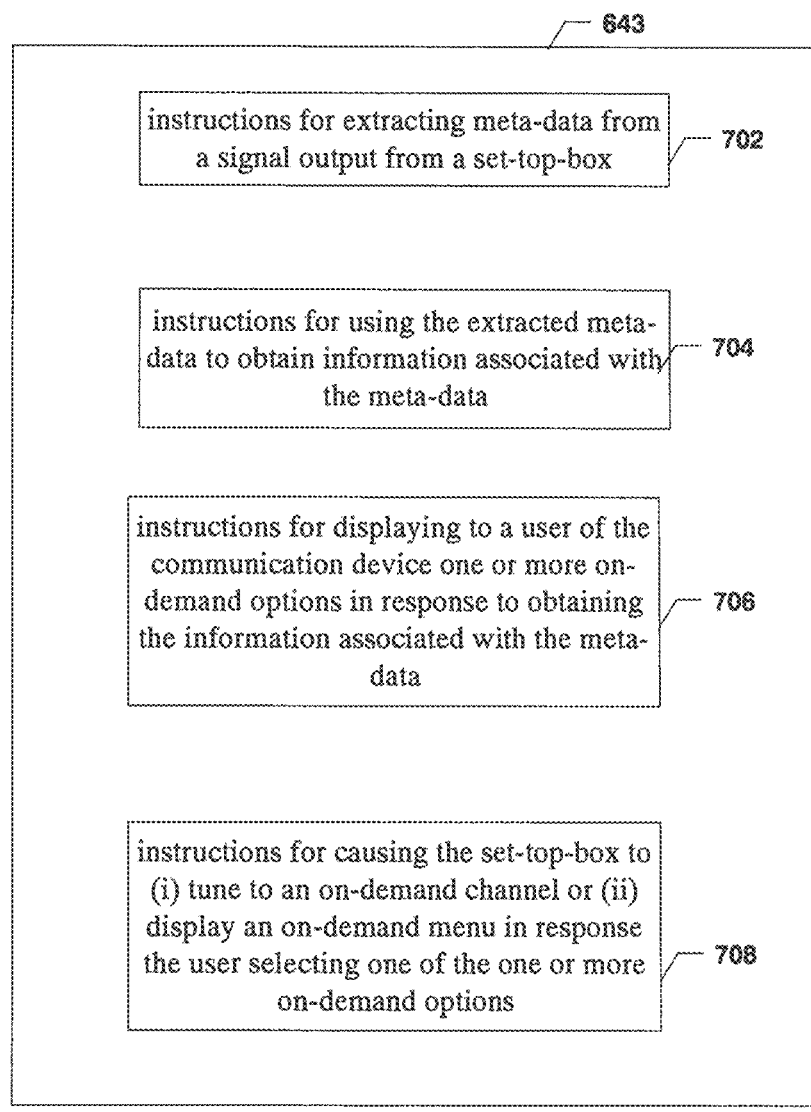
FIG. 7 illustrates components of an app according to some embodiments.

FIG. 7 illustrates an embodiment of app 643. In the embodiment shown, CRPC 643 includes: (1) a set of instructions 702 for extracting meta-data from a signal output from a set-top-box; (2) a set of instructions 704 for using the extracted meta-data to obtain information associated with the meta-data; (3) a set of instructions 706 for displaying to a user of the communication device one or more on-demand options in response to obtaining the information associated with the meta-data; and (4) a set of instructions 708 for causing the set-top-box to (i) tune to an on-demand channel or (ii) display an on-demand menu in response the user selecting one of the one or more on-demand options.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In a system comprising: (a) a set-top-box receiving data broadcast from a head-end system and (b) a communication device located near the set-top-box, wherein the data broadcast by the head-end system comprises audio and/or video data (audio/video data) corresponding to a particular media content item, a method performed by the communication device, comprising:

receiving, at the communication device, meta-data transmitted by the set-top-box, wherein the set-top-box automatically transmitted the meta-data in response to receiving a signal containing the meta-data regardless of whether a user of the communication device has performed any operation;

in response to receiving the meta-data, the communication device obtaining information associated with the received meta-data;

the communication device displaying one or more on-demand options in response to obtaining the information associated with the meta-data;

the communication device receiving user input indicating a user of the communication device has selected one of the displayed on-demand options;

the communication device causing the set-top-box to tune to an on-demand channel, which is not a linear channel, in response to receiving the user input indicating that the user has selected one of the on-demand options displayed by the communication device;

the communication device transmitting to the head-end system a message comprising information for identifying the set-top-box, wherein the head-end system is configured such that, in response to receiving the message, the head-end system transmits to the set-top-box a command that causes the set-top-box to: (i) tune to the on-demand channel or (ii) display the on-demand menu;

the message further comprises information identifying the on-demand option selected by the user; and the head-end system is further configured such that, in response to receiving the message, the head-end system unicasts to the set-top-box a media content item associated with the selected on-demand option.

2. The method of claim 1, wherein the step of receiving the meta-data comprises:

receiving an audio watermark embedded in the audio data, wherein the audio watermark includes the meta-data; and decoding the audio watermark to extract the meta-data from the audio watermark.

3. The method of claim 1, wherein the step of receiving the meta-data comprises receiving a visual watermark embedded in the video data, wherein the visual watermark includes the meta-data.

4. The method of claim 1, wherein the step of receiving the meta-data comprises receiving a message generated and transmitted by the set-top-box, wherein the message includes the meta-data.

5. The method of claim 1, wherein the step of transmitting the message to the head-end system consists of transmitting the message to an HTTP server that is a component of the head-end system.

6. The method of claim 1, wherein
the data broadcast by the head-end system comprises audio data corresponding to a song, and
the meta-data comprises one or more of: the title of the song, an artist identifier identifying the artist performing the song, a channel identifier, and a genre identifier identifying a music genre to which the song belongs.

7. The method of claim 6, wherein the step of the communication device obtaining said information associated with the received meta-data comprises:
the communication device transmitting to a server a request message containing at least a portion of the received meta-data, and
the communication device receiving from the server, in response to the request message, a web document.

8. The method of claim 7, wherein
the meta-data comprises the artist identifier identifying the artist performing the song,
the web document comprises a list of music videos by the artist, and
the step of displaying said on-demand options comprises displaying the web document.

9. The method of claim 8, wherein
in response to receiving the user input, the communication device causes the set-top-box to tune to said on-demand channel, and
the step of causing the set-top-box to tune to said on-demand channel comprises the communication device transmitting a message comprising an identifier identifying one of the music videos included in said list of music videos.

10. A communication device for enabling a user to initiate an on-demand session, the communication device comprising:
a receiver for receiving meta-data transmitted automatically by a set-top-box in response to the set-top-box receiving a signal containing the meta-data regardless of whether a user of the communication device has performed any operation; and
a data processing system, wherein
the data processing system is configured to (i) use the received meta-data to obtain information associated with the meta-data and (ii) display one or more on-demand options in response to obtaining the information associated with the meta-data,
the data processing system is operable to receive user input indicating that the user of the communication device has selected one of the displayed on-demand options,
the data processing system is further configured to cause the set-top-box to tune to an on-demand channel, which is not a linear channel in response to receiving the user input;
wherein data processing system is configured to cause the set-top-box to tune to an on-demand channel by using a network interface to transmit to the head-end system a message comprising information for identifying the set-top-box, wherein the head-end system is configured such that, in response to receiving the message, the head-end system transmits to the set-top-box a command that causes the set-top-box to tune to the on-demand channel;
the message further comprises information identifying the on-demand option selected by the user; and
the head-end system is further configured such that, in response to receiving the message, the head-end system unicasts to the set-top-box a media content item associated with the selected on-demand option.

11. The communication device of claim 10, wherein
the receiver is operable to receive the meta-data by receiving an audio signal output from a television speaker, and
the meta-data is encoded in the audio signal.

12. The communication device of claim 10, wherein
the receiver is operable to receive the meta-data by receiving a video signal output from a television display, and
the meta-data is encoded in the video signal.

13. The communication device of claim 10, wherein the receiver is operable to receive the meta-data by receiving a message transmitted from the set-top-box.

14. A computer program product comprising a non-transitory computer readable medium storing an app operable to be executed by a communication device, the app comprising:
instructions for extracting meta-data from a signal automatically transmitted from a set-top-box in response to the set-top-box receiving a signal containing the meta-data regardless of whether a user of the communication device has performed any operation;
instructions for using the extracted meta-data to obtain information associated with the meta-data;
instructions for displaying to a user of the communication device one or more on-demand options in response to obtaining the information associated with the meta-data;
instructions for causing the set-top-box to tune to an on-demand channel, which is not a linear channel in response the user selecting one of the one or more on-demand options;
instructions for transmitting a message to a head-end system configured to send a command to the set-to-box in response to receiving the message;
the message further comprises information identifying the on-demand option selected by the user; and
the head-end system is further configured such that, in response to receiving the message, the head-end system unicasts to the set-top-box a media content item associated with the selected on-demand option.

15. The computer program product of claim 14, wherein the signal transmitted from the set-top-box is: (1) a video signal, (2) an audio signal, and (3) a message.

16. The computer program product of claim 14, wherein the instructions for using the extracted meta-data to obtain information associated with the meta-data comprises instructions for transmitting to a remote server a request message including the meta-data.

17. The computer program product of claim 16, wherein the information associated with the meta-data is a web document generated by the remote server.

18. In a system comprising: (1) a plurality of set-top-boxes (STBs) including a first STB and a second STB; (2) a head-end system, and (3) a network enabling the first STB and the head-end system to communicate with each other, a method performed by the head-end system, comprising:
broadcasting, over the network, data comprising audio and/or video data (audio/video data) such that the audio/video data may be received simultaneously by the first STB and the second STB when both are tuned to the broadcast channel, the audio/video data corresponding to a particular media content item, wherein a user of the first STB has a communication device that is separate and distinct from the first STB and that is operable to: (i) receive meta-data output by the first STB, the meta-data being associated with the particular media content item, (ii) display to the user one or more on-demand options related to the particular media content item in response to receiving the meta-data, and (iii) transmit to the head-end system a message in response to the user selecting one of the on-demand options;

receiving from the communication device the message;

in response to receiving the message transmitted by the communication device in response to the user selecting one of the on-demand options, transmitting to the first STB a command that causes the first STB to tune to an on-demand channel;

wherein the command causes the first STB to tune to the on-demand channel, and the method further comprises, in response to receiving the message, transmitting to the STB a media content item selected based on information included in the message.

19. The method of claim 18, further comprising:

prior to broadcasting the data comprising the audio/video data, receiving the audio/video data from a programmer, wherein the meta-data is encoded in the audio/video data.

\* \* \* \* \*